June 14, 1955  J. F. MONGER  2,710,669
MEANS FOR LUBRICATING ROLLER BEARINGS
Filed March 6, 1952  3 Sheets-Sheet 1
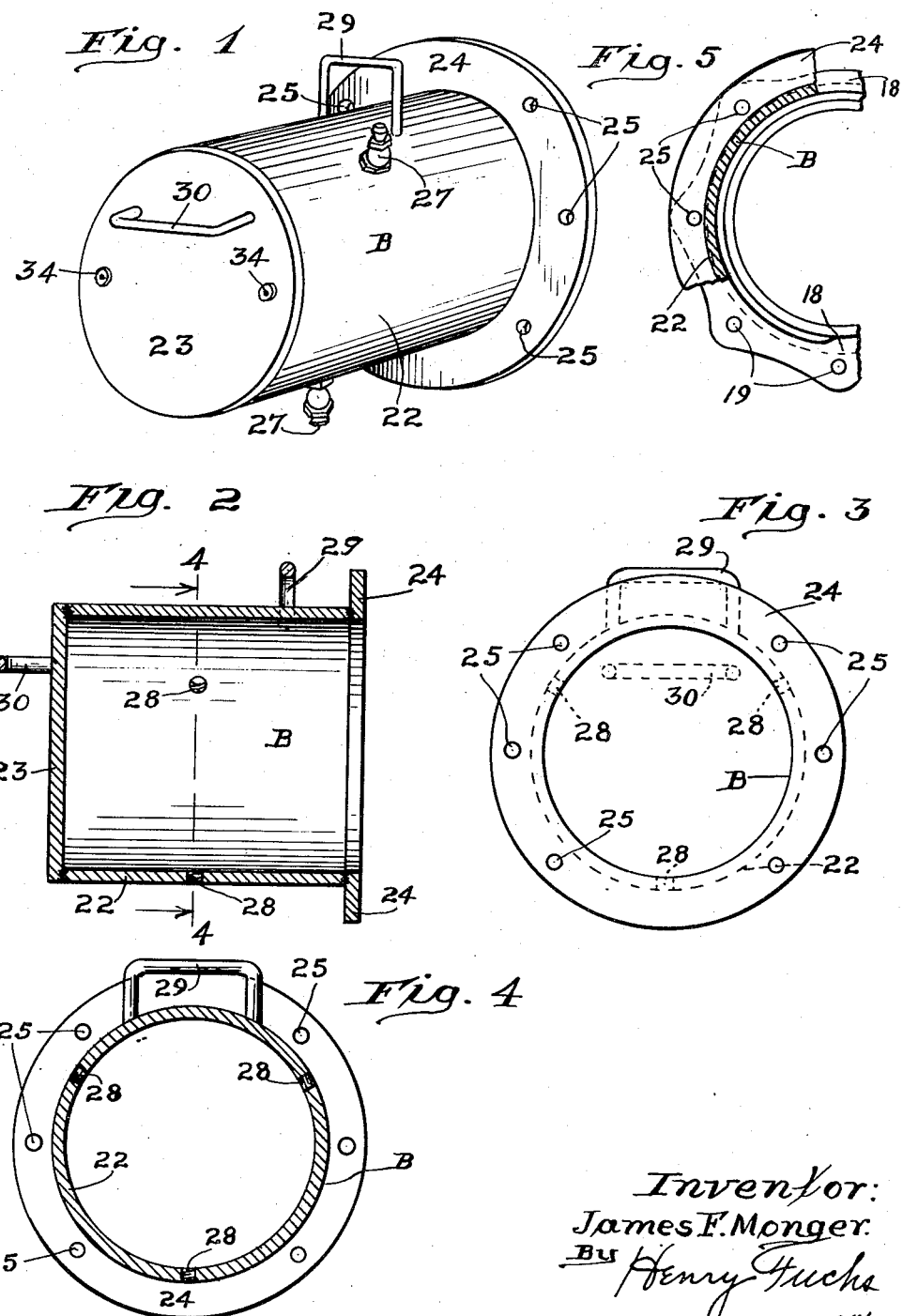

June 14, 1955    J. F. MONGER    2,710,669
MEANS FOR LUBRICATING ROLLER BEARINGS
Filed March 6, 1952    3 Sheets-Sheet 2

Inventor:
James F. Monger.
By Henry Fuchs
Atty.

June 14, 1955  J. F. MONGER  2,710,669
MEANS FOR LUBRICATING ROLLER BEARINGS
Filed March 6, 1952  3 Sheets-Sheet 3
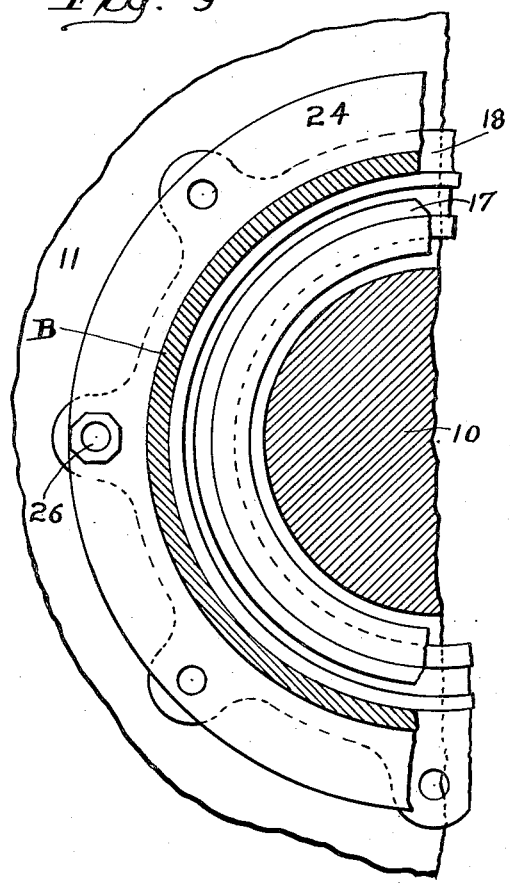
Fig. 9
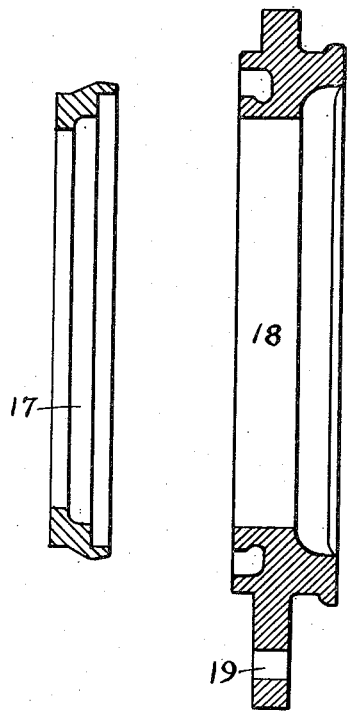
Fig. 10
Fig. 11
Inventor:
James F. Monger.
By Henry Fuchs
Atty.

United States Patent Office 2,710,669
Patented June 14, 1955

2,710,669

MEANS FOR LUBRICATING ROLLER BEARINGS

James F. Monger, Chicago, Ill.

Application March 6, 1952, Serial No. 275,055

4 Claims. (Cl. 184—1)

This invention relates to improvements in the apparatus for applying a lubricant, such as grease, to roller bearings of railway cars and locomotives.

One object of the invention is to provide a simple labor saving apparatus for applying grease to the roller bearings of railway cars and locomotives, which involves the following procedure: First, removing the outer housing of the roller bearing structure; then applying an enclosing adapter housing to the bearing in place of said outer housing; next, forcing grease into the adapter housing until the bearing parts and adapter housing are completely filled with grease; next, removing the adapter housing, and then reapplying the outer housing of the bearing to the bearing structure.

Another object of the invention is to provide means, in the form of an adapter, which is designed to be substituted for the outer housing of a roller bearing, to facilitate the operation of applying grease or similar lubricants to such a bearing.

A further object of the invention is to provide an adapter of the character hereinbefore set forth, which is in the form of a housing equipped with standard grease fittings for directing the grease into the housing, and is designed to be placed over the interior parts of a roller bearing of a railway car, and fixed in position by being secured to the usual enclosure part of the bearing from which the outer housing has been detached.

A more specific object of the invention is to provide an adapter as set forth in the preceding paragraph, wherein the housing is in the form of a cylinder open at its rear end and closed at its front end and having an attaching flange at its open rear end which is provided with bolt receiving openings adapted to accommodate bolts for securing the housing in place on the roller bearing structure of a railway car.

Other objects of the invention will more clearly appear from the description and claims hereinafter following.

Figure 6:
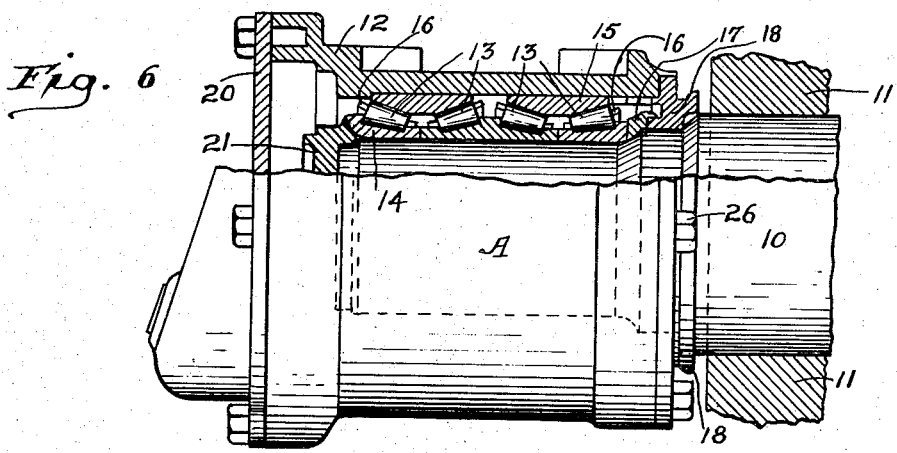
Figure 7:
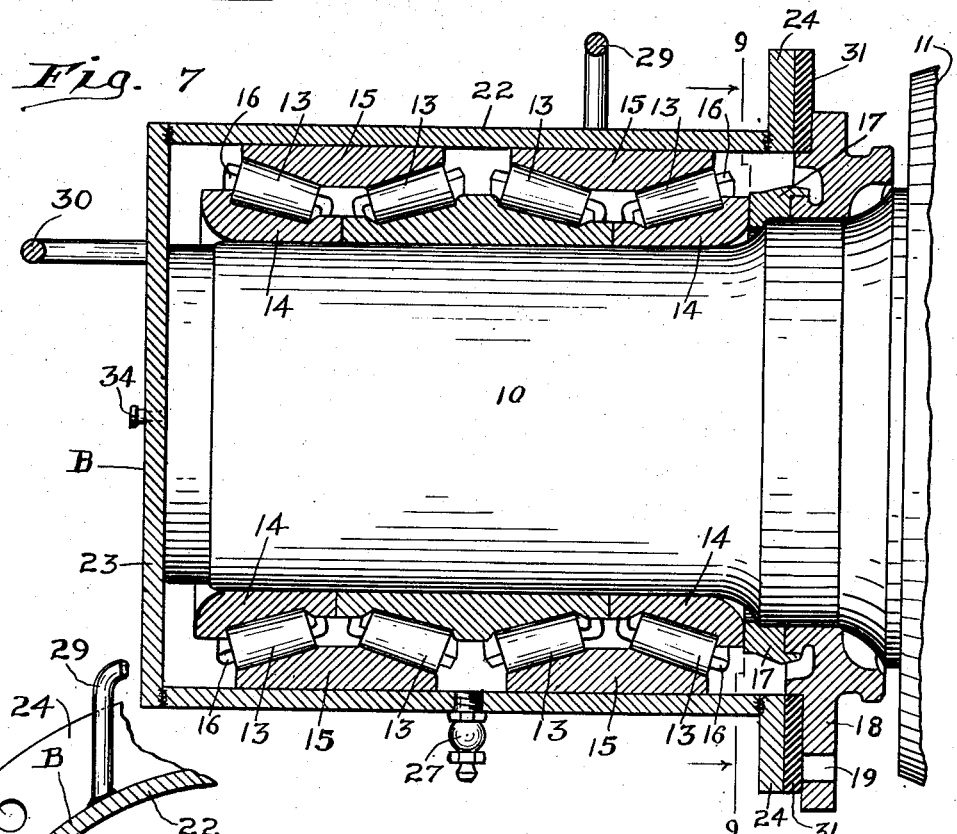
Figure 8:
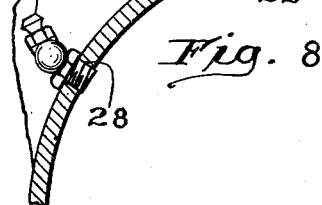

In the accompanying drawings forming a part of this specification, Figure 1 is a detailed perspective view of my improved adapter for greasing roller bearings. Figure 2 is a longitudinal vertical sectional view of Figure 1. Figure 3 is an end elevational view of Figure 2, looking from right to left in said figure. Figure 4 is a transverse, vertical sectional view, corresponding substantially to the line 4—4 of Figure 2 with the grease fittings removed. Figure 5 is a broken front elevational view of the enclosure ring of a well-known type of roller bearing, showing a broken away portion of the attaching flange of the adapter illustrated in Figure 1, as applied to said ring. Figure 6 is a part side elevational view and part vertical sectional view of a well-known type of roller bearing in mounted position on the axle of a railway car truck. Figure 7 is an enlarged vertical sectional view, similar to Figure 4, illustrating the improved adapter shown in Figures 1 to 4 inclusive in position on the roller bearing with the outer housing of the bearing which it replaces removed. Figure 8 is an enlarged, broken, transverse section of the upper portion of the housing shown in Figure 1. Figure 9 is a broken, transverse sectional view, corresponding substantially to the line 9—9 of Figure 7. Figure 10 is a vertical sectional view, through the enclosure ring shown in Figure 9. Figure 11 is a vertical sectional view through the flinger ring shown in Figure 9.

In said drawings, referring first to Figure 6, A indicates broadly a well-known design of roller bearing structure in applied position on the axle of a railway car truck, the axle being indicated by 10 and the associated car wheel by 11. The roller bearing structure illustrated in Figure 6 comprises the usual outer housing 12 which encloses the interior parts of the roller bearing structure, also shown in Figures 7 and 9. These interior parts of the roller bearing structure include the usual rollers 13, inner and outer rings 14 and 15 forming raceways for the rollers, and roller retaining rings 16. This bearing structure includes further the usual flinger and enclosure rings 17 and 18, the axle 10 which extends through these rings being freely rotatable in the enclosure ring 18 and having the flinger ring 17 fixed thereto so as to retain the enclosure ring 18 against outward movement on said axle while permitting rotation of the latter therein.

The outer housing 12 of the bearing structure is fixed in position by being bolted to the enclosure ring by fastening elements which extend through bolt openings 19 provided in the enclosure ring 18 and aligned with openings provided in the attaching flange of the housing 12. As is well understood by those skilled in this art, the enclosure ring 18 is held against rotation by being secured to the outer housing which is held against rotation within the pedestal structure of the railway car truck. As shown in Figure 6, the outer housing 12 is closed at its outer or front end by a detachable cover plate 20, and the axle 10 carries an end cap 21 at its outer end, which is removably secured thereto and retains the end raceway 14 against outward movement.

In carrying out my invention, I employ the adapter shown in Figures 1, 2, 3, 4, 7, 8, and 9, which is substituted for the outer housing 12 during the operation of greasing the roller bearing member.

The adapter is in the form of a housing B, comprising a hollow cylindrical main body portion 22, closed at its outer end by a vertical wall 23 in the form of a circular plate welded to said main body portion. The body portion 22 is of such interior diameter as to snugly fit over and enclose the outer rings 15 of the roller bearing structure. At its open inner end, the cylindrical body portion 22 of the adapter is provided with a laterally outstanding attaching flange 24, which is in the form of a flat ring welded to the inner end of said body portion. The flange 24 is provided with circumferentially spaced bolt receiving openings 25, adapted to accommodate securing bolts 26 for attaching the adapter housing B to the enclosure ring 18 of the roller bearing structure, as shown in Figures 7 and 9. The housing B is equipped with a plurality of standard grease fittings 27 secured in threaded openings 28 provided in the wall of the cylindrical body portion 22 of said housing, three such fittings being shown as used in the construction of the adapter housing illustrated. The housing B is further provided with perforated vent plugs 34 through which excess of grease may escape, these plugs being secured in suitable openings provided in the wall 23 at the front end of the housing.

To facilitate manipulation and handling of the housing B, the same is provided with two grab handles 29 and 30, the handle 30 being fixed to the upper portion of the front wall 23 and the handle 29 being fixed in upstanding position to the top side of the rear end portion of the cylindrical body portion 22 of said housing.

In carrying out my improved procedure for greasing roller bearings of cars, the following procedure is followed: The outer housing 12, including the cover plate 20, is first detached from the enclosure ring 18 and removed completely from the remaining inner bearing structure. The axle end cap 21 is also detached from the axle 10. The adapter housing B is then applied over the interior bearing parts in place of the removed outer housing 12 of the roller bearing with the vertical wall 13 of said adapter abutting the outer end of the axle 10, as shown in Figure 7, a sealing washer 31 of suitable material, such as fiber or rubber, being interposed between the flange 24 of the housing B and the enclosure ring 18. The adapter housing is then securely fixed in position by a suitable number of bolts 26 engaged through selected openings of the enclosure ring 18 and the housing flange 24, preferably two such bolts being employed, the same being disposed at diametrically opposite sides of said adapter housing. After this has been done, grease is forced into the adapter housing in the usual manner, through the grease fittings 27 by means of a grease gun or similar device applied to said fittings, until the housing is completely filled, which is indicated by the grease oozing out of the vent plugs 34. After the grease has been thus applied, the adapter housing B is removed and the outer housing 12 of the bearing is replaced and fixed in position.

I claim:

1. An adapter for greasing standard sized roller bearings of railway car axles including an outer housing of the usual standard interior diameter, said adapter comprising a hollow cylindrical body portion closed at one end by a vertical wall and having an attaching flange at its other end, said cylindrical body portion corresponding in interior diameter to the interior diameter of said housing of said standard bearing, said cylindrical body portion having openings through the wall thereof in which are secured grease fittings for directing the grease onto the roller bearings.

2. An adapter for greasing standard size roller bearings of axles of standard length of railway cars wherein said roller bearings include an outer housing of the usual standard interior diameter, said adapter comprising a hollow cylindrical body portion adapted to be substituted for said housing, said body portion being closed at one end by a vertical wall and having an annular attaching flange at its other end, said vertical wall being spaced from said flange a distance equal to the projection of the car axle outwardly beyond said flange so as to abut the end of said axle when the adapter is in applied position, said cylindrical body portion corresponding in interior diameter to the interior diameter of said housing of said standard bearing, said cylindrical body portion having openings through the wall thereof in which are secured grease fittings for directing the grease onto the roller bearings.

3. An adapter for greasing roller bearings of standard size and design of railway car axles, wherein the bearings include outer raceway rings of predetermined standard exterior diameter, said adapter comprising a hollow cylindrical body portion closed at one end by a vertical wall and having an attaching flange at its other end, said cylindrical body portion being of an interior diameter to fit the exterior diameter of said raceway rings, said body portion having grease conveying openings for directing grease to the interior of said body portion.

4. An adapter for greasing standard roller bearings of axles of railway cars, including an outer housing of the usual interior diameter of such standard bearings, said adapter comprising a hollow cylindrical body portion corresponding in interior diameter to said housing and closed at one end by a vertical wall and having an annular outwardly projecting attaching flange at its other end, said body portion being provided with grab handles for manipulating the same, said handles being fixed respectively to the top side of the cylindrical body portion and to the outer side of said vertical wall above the axial center of said body portion, said cylindrical body portion having openings through the wall thereof in which are secured grease fittings for directing the grease onto the roller bearings.

References Cited in the file of this patent

UNITED STATES PATENTS

| | | |
|---|---|---|
| 1,489,383 | Church | Apr. 8, 1924 |
| 1,686,872 | Miller | Oct. 9, 1928 |
| 1,752,284 | Trench | Mar. 25, 1930 |
| 1,898,823 | Forbes | Feb. 21, 1933 |
| 1,949,505 | Warren | Mar. 6, 1934 |
| 2,210,478 | Berg | Aug. 6, 1940 |
| 2,249,501 | Teker | July 15, 1941 |
| 2,369,178 | Richmond | Feb. 13, 1945 |
| 2,427,233 | Shartle | Sept. 9, 1947 |
| 2,514,799 | Rubertino | July 11, 1950 |